United States Patent
Kukla et al.

(10) Patent No.: US 12,019,662 B2
(45) Date of Patent: *Jun. 25, 2024

(54) AUTOMATICALLY ASSESSING STRUCTURED DATA FOR DECISION MAKING

(71) Applicant: RedShred LLC, Baltimore, MD (US)

(72) Inventors: James Michael Kukla, Ellicott City, MD (US); Jeehye Yun, Ellicott City, MD (US)

(73) Assignee: RedShred LLC, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,926

(22) Filed: Jan. 30, 2023

(65) Prior Publication Data
US 2023/0281230 A1    Sep. 7, 2023

Related U.S. Application Data

(63) Continuation of application No. 17/070,961, filed on Oct. 15, 2020, now Pat. No. 11,567,979, which is a continuation of application No. 15/344,995, filed on Nov. 7, 2016, now Pat. No. 10,810,240.

(60) Provisional application No. 62/252,317, filed on Nov. 6, 2015.

(51) Int. Cl.
| | |
|---|---|
| G06F 16/00 | (2019.01) |
| G06F 16/33 | (2019.01) |
| G06F 16/338 | (2019.01) |
| G06F 16/93 | (2019.01) |

(52) U.S. Cl.
CPC .......... *G06F 16/334* (2019.01); *G06F 16/338* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 6,026,177 | A * | 2/2000 | Mong | G06V 30/244 382/156 |
| 6,356,909 | B1 | 3/2002 | Spencer | |
| 6,598,015 | B1 * | 7/2003 | Peterson | G06F 40/45 704/5 |
| 8,468,445 | B2 * | 6/2013 | Gupta | G06F 16/80 715/255 |
| 8,504,827 | B1 * | 8/2013 | Sizer | G06F 16/93 713/167 |
| 8,879,813 | B1 * | 11/2014 | Solanki | G06F 16/583 382/128 |
| 8,949,899 | B2 * | 2/2015 | Errico | H04N 21/44224 725/46 |
| 9,904,726 | B2 * | 2/2018 | Lundberg | G06Q 10/00 |
| 10,075,482 | B2 | 9/2018 | Chinnapatlolla | |
| 2004/0243633 | A1 | 12/2004 | Thompson | |

(Continued)

*Primary Examiner* — Hasanul Mobin
(74) *Attorney, Agent, or Firm* — Butzel Long

(57) ABSTRACT

A computerized system and methods are provided for the automated extraction of contextually relevant information, and the automatic processing of actionable information from generic document sets. More specifically, automated systems and techniques for the extraction and processing of opportunity documents, are provided, which avoid inaccuracies and inefficiencies resulting from conventional and/or human-based document processing techniques.

18 Claims, 4 Drawing Sheets

(56) References Cited

U.S. PATENT DOCUMENTS

| | | | |
|---|---|---|---|
| 2005/0041860 A1* | 2/2005 | Jager | G06V 30/416 382/173 |
| 2005/0050054 A1* | 3/2005 | Clark | G06F 16/27 |
| 2005/0165642 A1* | 7/2005 | Brouze | G06Q 30/02 705/14.69 |
| 2005/0256844 A1* | 11/2005 | Cristol | G06Q 30/02 |
| 2006/0023940 A1* | 2/2006 | Katsuyama | G06V 10/143 382/176 |
| 2006/0094019 A1* | 5/2006 | Selvin | C12Q 1/6827 536/25.32 |
| 2006/0163480 A1* | 7/2006 | Koyama | G01R 31/311 250/310 |
| 2006/0235831 A1* | 10/2006 | Adinolfi | G06Q 40/00 |
| 2006/0242159 A1 | 10/2006 | Bishop | |
| 2007/0016863 A1* | 1/2007 | Qu | G06F 16/36 715/702 |
| 2007/0023658 A1* | 2/2007 | Nozoe | G06T 7/0004 250/310 |
| 2007/0120844 A1* | 5/2007 | Beikirch | G06V 10/945 382/141 |
| 2007/0138390 A1* | 6/2007 | Nishiyama | H01J 37/28 250/310 |
| 2008/0046838 A1 | 2/2008 | Haub | |
| 2008/0235271 A1* | 9/2008 | Wang | G06F 16/289 |
| 2008/0243479 A1* | 10/2008 | Cafarella | G06F 16/358 707/E17.093 |
| 2008/0270380 A1* | 10/2008 | Ohrn | G06F 16/345 707/999.005 |
| 2009/0287692 A1* | 11/2009 | Ookuma | G06F 16/93 707/999.005 |
| 2010/0082177 A1 | 4/2010 | Chang | |
| 2011/0258213 A1* | 10/2011 | Pollara | G06F 16/36 707/765 |
| 2012/0008132 A1* | 1/2012 | Saito | G01N 21/9501 356/72 |
| 2012/0109641 A1* | 5/2012 | Boone | G06F 40/30 704/9 |
| 2012/0284199 A1* | 11/2012 | Lundberg | G06F 40/30 705/310 |
| 2013/0006986 A1* | 1/2013 | Phan | G06Q 10/101 707/E17.046 |
| 2013/0007648 A1* | 1/2013 | Gamon | G06Q 10/107 715/771 |
| 2013/0046782 A1* | 2/2013 | Lee | G06Q 10/10 707/769 |
| 2013/0077857 A1* | 3/2013 | Privault | G06V 10/70 382/159 |
| 2014/0006526 A1* | 1/2014 | Jorasch | G06Q 10/107 709/206 |
| 2014/0012853 A1* | 1/2014 | Watanabe | G06F 16/335 707/738 |
| 2014/0025443 A1* | 1/2014 | Onischuk | G07C 13/00 705/12 |
| 2014/0067926 A1* | 3/2014 | O'Shaughnessy | H04L 67/06 709/203 |
| 2014/0304622 A1* | 10/2014 | Jorasch | H04L 12/1813 715/753 |
| 2015/0012339 A1* | 1/2015 | Onischuk | G07C 13/00 235/386 |
| 2015/0310128 A1* | 10/2015 | Brav | G06F 16/9024 707/800 |
| 2015/0339298 A1* | 11/2015 | Morimoto | G06F 16/35 707/730 |
| 2016/0019192 A1* | 1/2016 | Crapo | G06F 40/30 715/234 |
| 2016/0048936 A1* | 2/2016 | Perkowski | G06Q 10/063 705/310 |
| 2016/0179945 A1* | 6/2016 | Lastra Diaz | G06F 16/284 707/739 |
| 2017/0052944 A1 | 2/2017 | Choudhry | |
| 2017/0075877 A1* | 3/2017 | Lepeltier | G06F 40/117 |
| 2017/0132203 A1* | 5/2017 | Kim | G06F 40/279 |
| 2018/0219827 A1 | 8/2018 | Agathangelos | |
| 2021/0240748 A1* | 8/2021 | Kukla | G06F 16/93 |
| 2023/0281230 A1* | 9/2023 | Kukla | G06F 16/334 707/722 |

* cited by examiner

AUTOMATICALLY ASSESSING STRUCTURED DATA FOR DECISION MAKING

CROSS-REFERENCE TO RELATED APPLICATIONS

This application claims the priority benefit of U.S. Application Ser. No. 62/252,317, filed Nov. 6, 2015, the disclosure of which is incorporated by reference in its entirety.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright 2015, RedShread, LLC.

BACKGROUND

The exemplary, illustrative, technology herein relates to systems, software, and methods for the automated contextual processing of document sets and, in particular, the automated contextual processing of procurement document sets.

Conventional techniques for processing certain types of documents, such as grant proposals, RFPs, and the like, typically include downloading individual files from multiple online sources and editing them with a variety of desktop computer applications such as Adobe Acrobat, Microsoft Word, and the like. Users often then use primitive keyword search techniques to find areas of interest by guessing at the wording that may be used inside each particular document. These activities may be repeated across many documents from many different sources, which generally will not be in a common format or structure.

BRIEF SUMMARY

According to embodiments of the disclosed subject matter, methods and systems are provided for obtaining, processing, and providing simplified and efficient access to opportunity documents. In an example embodiment, a computer system obtains one or more opportunity documents that list requirements for participating in an opportunity. The system may extract various information from the opportunity documents, such as structure information, which may be used to classify the first opportunity document into an opportunity document type. Similarly, the system may extract one or more well known objects or other data from the first opportunity document, and determine a substantive effect of the data within the opportunity. As another example, the system may extract one or more requirements of the opportunity from the first opportunity document. Opportunity information including an indication of the structure information, the substantive effect, the first requirement, the contents of the opportunity document, or a combination thereof, may be automatically compiled and provided to a user.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
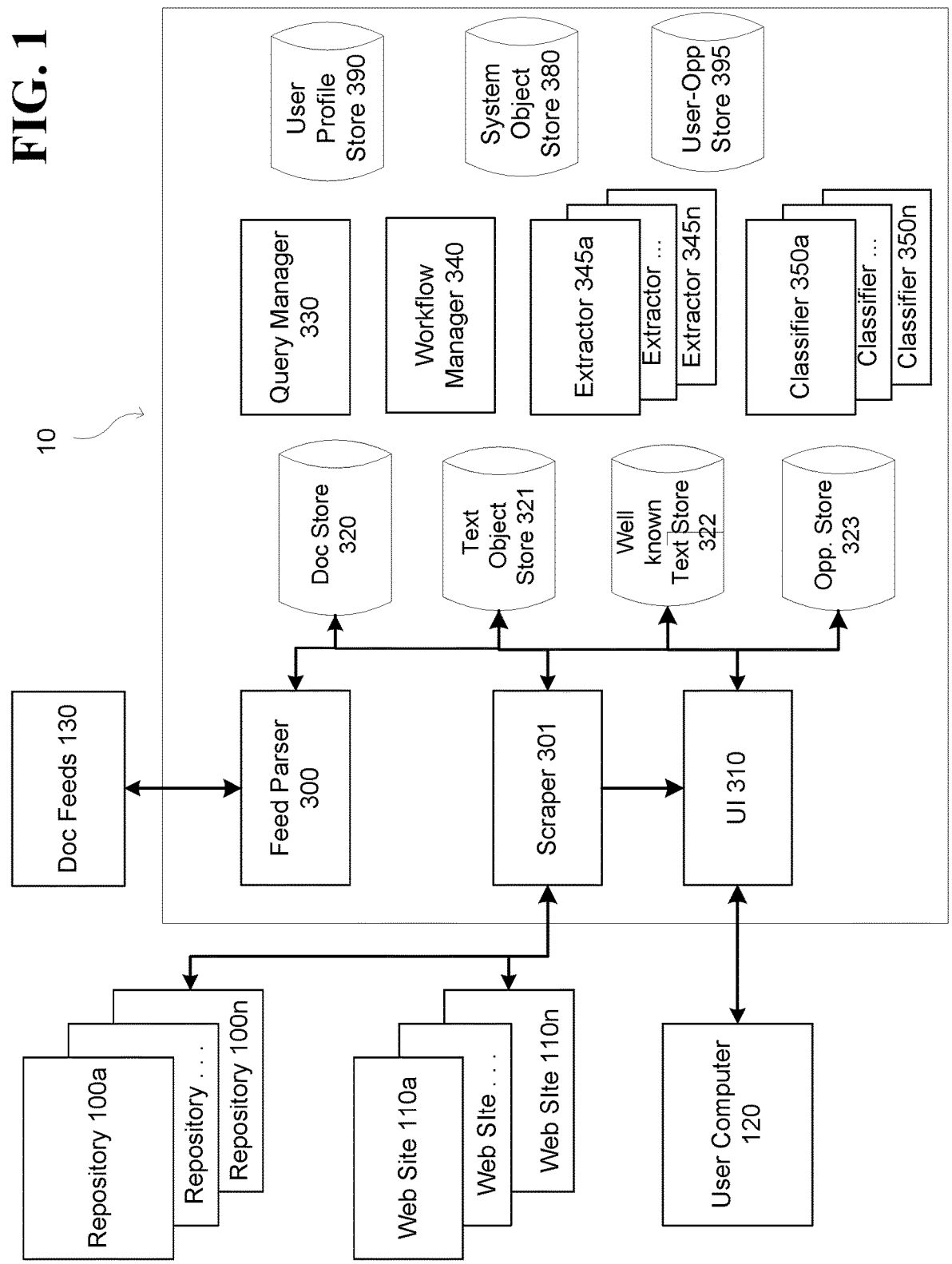
FIG. 1 shows a schematic representation of a system according to an embodiment of the disclosed subject matter.

As previously disclosed, opportunity documents, such as RFPs and grant solicitations, often are a challenge to process in order to determine if they should be responded to. Conventional techniques for processing such documents may be inadequate because users often may be required search documents related to opportunities such as grants, RFPs, and the like, using basic keyword searches, and then annotate, highlight, or otherwise manually mark results of interest in different documents. Such manual comparisons may be necessary due to the proliferation of multiple, largely incompatible document formats and structures. This tedious activity is prone to miss relevant passages due to unexpected variety of phrasing, misspellings and shifts in language over time. For example, different documents may refer to a "fence", whereas others may refer to the same structure as related to "perimeter security". Users may highlight or comment on the search results inside these documents, complete portions of one or more documents, or the like. Users may then share these annotated documents with one another via email, network shared drives, portal software such as Microsoft SharePoint, or the like. This may cause confusion regarding which user has edited, or should edit, each document and may cause a multitude of versions of each document to be available. As a result, conventional techniques often require users to anticipate varieties of wording in advance, communicate continuously out-of-band to coordinate editing among multiple users, and routinely context switch from one question to the next when looking for data for decision points. For example, a user may first need to find due date information, then eligibility information, and then past performance requirements, all of which may be distributed across multiple documents, which may be in different formats, and may be provided by different sources.

This document describes a computerized system and methods for the extraction of contextually relevant information, and the automatic processing of "actionable" information from generic document sets. More specifically, the extraction and processing of a particular class of documents, called opportunity documents, is described in detail. As used herein, "opportunity documents" are documents such as requests for proposals (RFPs), grant solicitations, and the like, which may be processed and/or responded to.

Opportunity documents are generally described entirely in prose or semi-structured text (e.g. tables, lists), encoding a wide range of information (requirements, constraints, deadlines, terms and conditions) using completely uncontrolled natural language, and often contain a significant amount of standard (aka boilerplate) contractual clauses that obscure the detailed information. Worse, because these documents are closely related to legal documents, they tend to have long sentences and attempt to convey complex concepts. The documents are often large (ranging in size from one to hundreds of pages), have differing vocabulary and language use, and are provided in a variety of heterogeneous formats (e.g. PDF, Microsoft Word, Excel Spreadsheet). Thus, these documents may be difficult for humans to understand, and even more difficult to process in any automated or semi-automated way.

Specifically, these factors together make it difficult to extract the deterministic, structured data that are needed for standard algorithms. The techniques used for analyzing and extracting knowledge from unstructured text include named entity recognition, information extraction, parsing, part of speech tagging, handling of polysemy, and inference.

Further challenges arise in that errors are often made in producing these documents. Additional documents are often subsequently added to an opportunity corpus to correct these errors, sometimes replacing all or part of the original documents in the corpus. The initial processing of a corpus must be reprocessed based upon the updated parts of the corpus.

Embodiments disclosed herein include a system that provides an overall automated workflow for accepting input document(s) inputs, pre-processing them, analyzing them for various characteristics, storing the documents and the characteristics resulting from the analysis, and producing various electronic data products. For example, the system may be used to upload request for proposal documents (RFPs) or other opportunity documents in order to make a rapid go/no-go decision on bidding on each opportunity. The ability to automatically extract, summarize the content, and present the relevant decision points provides significant time and cost savings to users. For example, in comparison to conventional techniques for processing such documents, embodiments disclosed herein provide for automated identification of relevant decision points within a document, without the need for individual human evaluation. This also may reduce the processing time and resources required to evaluate such documents, thereby allowing users to respond more thoroughly and quickly than would be possible using conventional document processing techniques.

The input, extraction, summarization, and decision points used are defined using a user-defined corpus-processing workflow, which includes the use of one or more user-specified contextual elements stored within a user profile. These contextual elements influence the processing and interpretation of the corpus and the responses provided by the system to the user. In some embodiments, once the corpus-processing workflow is initially structured by a user, no further user intervention may be required to apply the workflow to new documents or new document types, thereby allowing for rapid extension to additional document types.

FIG. 1 shows an example architecture of a system as disclosed herein. The system 10 is operated using one or more computers of typical manufacture, including at least one processor, memories (both transient and persistent), network connectivity, such as wired and/or wireless networking, and custom programming effective to configure the processor and memories in order to configure and operate an opportunity document processing system as described herein. Examples of such a computer system are provided in further detail herein, The system interfaces to a number of external document sources, such as document repositories 100a, 100b, external web sites 110a, 110b, such as FedBiz, and similar sources of opportunity documents and information related to them. The interface may be provided by one or more "scrapers" 301. As used herein, a "scraper" refers to a software agent with detailed programming and access credentials that permit it to access at least one external document source (e.g. a repository, a web site, a file share, or the like) and obtain opportunity documents and information about opportunity documents (e.g. opportunity and opportunity document metadata). Each scraper stores the obtained documents and metadata in one or more document stores 320. One or more scrapers may be utilized, each customized for the repository or web site they interface with. For example, each external site from which opportunity documents and metadata are to be collected may be associated with a separate and independent scraper that is designed to obtain information specifically from the site. Alternatively or in addition, a single scraper may be used for similar sites. As a specific example, multiple government agencies may use a common backend system for providing and receiving opportunity documents, with each agency having a customized interface. In such a configuration, a single scraper may be configured to obtain data from any of the similar sites, even though the specific user interface may appear different when viewed by a human.

Document feeds 130 may also be automatically processed by one or more feed processors 300, which take documents and document metadata provided in one or more document feeds and add them to one or more document stores in the system. Examples of document feeds may include the output of automated document creation workflow systems that are used to manage the creation and approvals of opportunity documents, such as automated publishing systems of conventional design.

A user also may upload documents and document metadata to the system using an interface such as a web browser or a built in user interface component 310.

Opportunity documents and document metadata are thus automatically obtained from the external document sources by scrapers, feed processors, and user uploads and are added to the system for subsequent use. Scrapers and feed processors may operate on an ad-hoc, scheduled, or task driven basis, or any combination thereof, in response to other processing occurring within the system.

Each document and document meta-data obtained by the above methods (or by other methods not described) is stored in one or more storage subsystems referred to herein as document stores 320. Document stores typically are configured and/or optimized to manage documents and document metadata in their native form (e.g. a MS Word document, an Excel spreadsheet, a PDF document, a Visio drawing, or the like). In general, document stores may be a persistent store of the underlying computer system such as a local disk drive, may be network attached persistent storage such as network-attached-storage (NAS), a commercial database system such as those provided by the Oracle Corporation, or may be a custom document storage system.

Once each document and document metadata item is stored, it is pre-processed under the direction of the workflow manager 340 which implements a document pre-processing workflow. The pre-processing workflow may vary based upon document type and/or source and is defined in the system object store. The preprocessing workflow takes each input document (or document metadata) and operates one or more information extractor systems to convert the "raw" input document into normalized text streams within a document structure. There may be a number of different extractors that are used, based in part upon the workflow being performed by the workflow manager, and in part based upon the information extracted from the subject document and/or document metadata. The results of the extractor processing may be collected and stored in a "text object store" 321. Often, the results of extractor processing may include a structured representation of one or more parts of the original text document along with references back to the original text document in the document store. In general, text object stores may be a persistent store of the underlying computer system such as a local disk drive, may be network attached persistent storage such as network-attached-storage (NAS), a commercial database system such as those provided by the Oracle Corporation, or may be a custom storage system optimizes for the efficient storage of normalized text, metadata, and extracted information.

Figure 2:
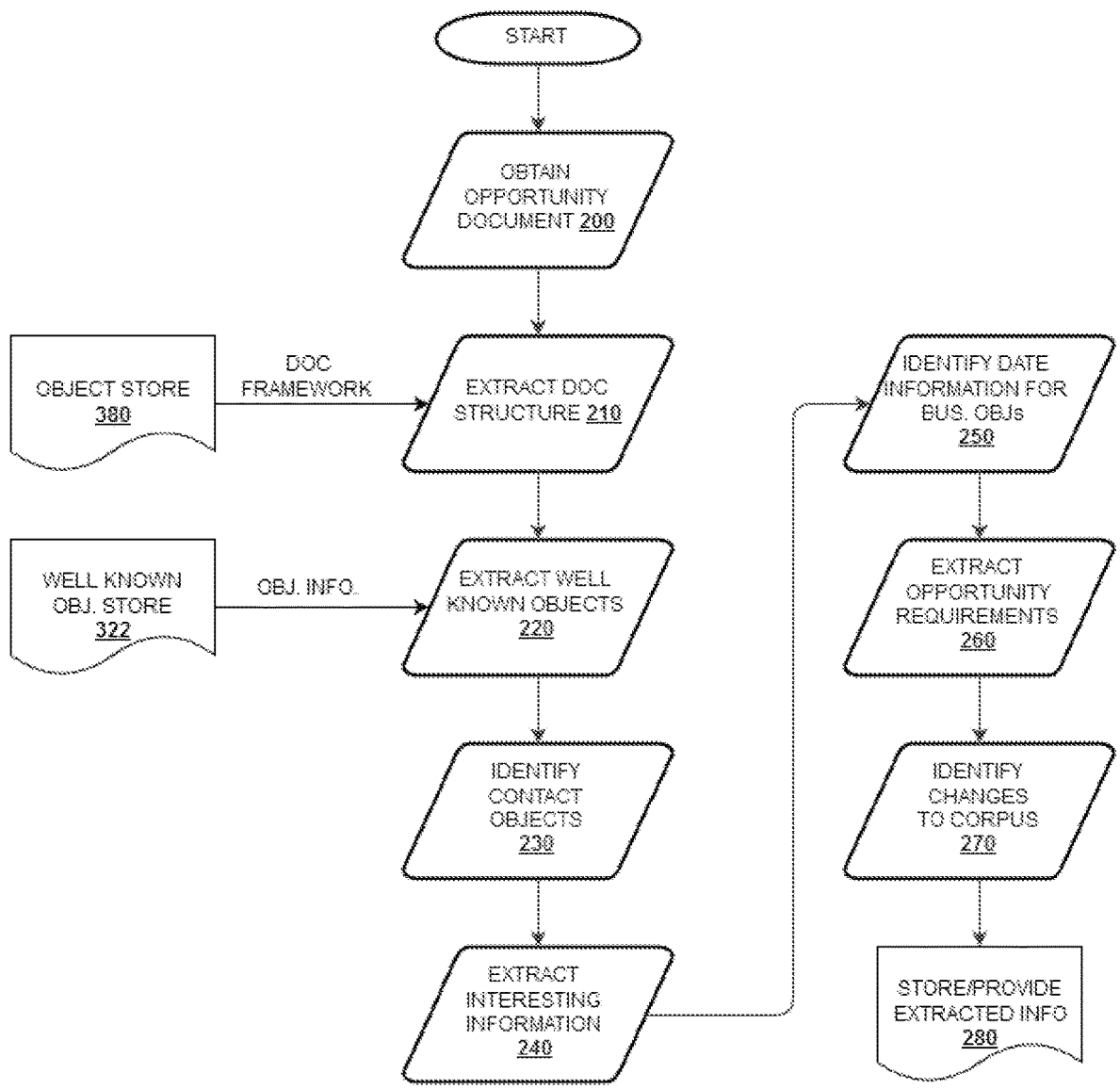
FIG. 2 shows an example process for extracting information from a document according to an embodiment of the disclosed subject matter.

FIG. 2 shows an example process for extracting information from a document according to an embodiment. Referring to FIG. 1 and FIG. 2, at 200 an opportunity document may be obtained from a document source as disclosed herein. For example, the document may be downloaded from a remote source by a user and provided to a system as disclosed herein, it may be automatically downloaded as disclosed herein, or it may represent information obtained by a scraper as disclosed herein. At 210, a first example information extractor may extract document structure information from the document and encode this structure information into a structured document framework, such as a contract document structure. The structured document framework may be a common framework taken from the system object store 380, or may be contracted on an ad-hoc basis by the information extractor, and may vary based upon the type of document or based upon information known about the document (such as its type, source, or other metadata derived information). This structured document framework may further identify specific business objects that must be identified in the document (such as the point of contact person, contract type, period of performance, etc.) by subsequent extractor and classifiers.

At 220, a second example information extractor may process a document to identify well known (or "boilerplate") text such as commonly included terms and conditions such as, for example, Federal Acquisition Regulation (FAR) clauses. Such clauses may be used throughout many disparate types of documents. Once identified, the boilerplate text in the text object store may be replaced or annotated with references to pre-processed information about the boilerplate text stored in the "well known object" store 322. The well known object store contains information about common or well known objects, such as boilerplate text and any related requirements, etc., common organization names, people, and the like. That is, "well known objects" may be those that have been identified or may be identified across many different types of documents. The automated identification of well known objects may significantly reduce the processing resources needed to process opportunity documents, by allowing for rapid identification and processing of such objects which otherwise would need to be processed individually. For example, a common FAR clause that occurs in multiple different types of opportunity documents may be processed immediately as a well known object, whereas individual processing techniques or human review would need to consider each clause in each document separately to determine the specific effect of the clause. In contrast, embodiments disclosed herein may be able to immediately identify the clause and thus known the effect of the clause, without requiring additional processing or consideration.

At 230, a third example information extractor may identify people and contact objects referenced in the document, including information such as name, title, role, and contact information. For example, the information extractor may identify a specific person as the point of contact for questions (e.g. a role) and identify a second (or the same) specific person as the person responsible for management of any resulting contract. The information extractor may match the identified person against other identified people in the text object and/or well known text object stores, and establish the appropriate references. In contrast to conventional document analysis techniques, the automated extraction of people and contact objects disclosed herein may allow for rapid cross-referencing of people or other entities with online sources such as social media sites, government information sites, and the like, and online news sources, thereby providing rich contextual information to aid in decision-making. In contrast, conventional techniques would require substantial "out-of-band" research by humans interacting with the relevant documents, which may be inefficient and inaccurate.

At 240, a fourth example information extractor may extract "interesting" information from the document. Interesting information includes business object identification and varies based upon the type of document and the context under which it is being processed. For example, a contract document may include information regarding one or more of contract type, type and period of performance, start date, end date, and billing and delivery requirements. In some cases, these items may be specified as business objects within a structured document template (as described above).

At 250, a fifth example information extractor may identify and extract specific dates and/or time periods and associate those dates and/or time periods with specific business objects or attributes (such as period of performance). For example, an information extractor may identify period of performance date range(s) and expected award date for an RFP, extract that information from the original text documents, and associate it with one or more predefined document attributes and/or business objects.

At 260, a sixth example information extractor may identify and extract one or more "opportunity requirements" which may include, for example, specific identified requirements, deliverables, or performance items. In some case, a requirements extractor may operate in conjunction with the date/time period functions at 250 to identify specific performance or deliverable items and associate them with specific time periods or due dates.

At 270, a seventh example information extractor may identify amendments and changes to an opportunity document corpus. Specifically, the information extractor identifies sections of the opportunity document corpus that have been superseded or replaced by a subsequent amendment, and updates/replaces previously identified dates, requirements, etc. extracted from the replaced sections/documents with newly identified counterpart information from the amendment.

Although FIG. 2 shows various example information extractors operating serially, in some embodiments one or more extractors may be operated partially or entirely in parallel. Further, each of the information extractors may be implemented as a stand-alone executable code component such as extractors 345*a*, 345*b*, by a classifier 350*a*, or in combination of stand-alone code and one or more classifiers or classes of classifiers. Further, a single module of executable code and/or hardware may implement one or more information extractors and/or classifiers, serially or in parallel. A primary difference between extractors and classifiers is that extractors are more mechanical pattern matching programs and classifiers are typically machine learning programs. This results in extractors being more deterministic and classifiers being more probabilistic in their operation. In either case, their general function is the same, which is examine an aspect of a corpus and produce information results extracted from the corpus. As a specific example, an extractor may identify specific clauses within an opportunity document or corpus as disclosed above. The presence of these clauses is not probabilistic, since the extractor may identify the specific clause, the specific location of the clause within the document, and the like. An associated classifier may use the presence, absence, or relationship between clauses to assign a type to the document, such as a contract type, RFP type, and the like. The classifier may assign a probability to each type, e.g., a single document may be identified as 70% likely to be a contract, and 30% likely to be an RFP. Alternatively or in addition, a classifier may use information obtained by one or more extractors to assign a single type or other classification to a document, even though the operation of the classifier itself may be probabilistic.

The information extraction process may be performed in a serial, parallel, or iterative fashion, as determined by the documents being processed and the processing instructions provided by the workflow manager 340.

A system as disclosed herein may define its default operation parameters as a series of structures stored within the system object store 380. Information stored in the system profile includes the default workflows implemented by the workflow manager to process each document added to the system (including preconfigured questions to be asked about opportunities), configuration information identifying one or more extractors and/or classifiers implemented in the system, etc. The system profile identifies one or more "business objects" that may be identified by extractors and classifiers, and may provide information related to the processing instructions for, and the training of, the system's classifiers and extractors.

User information, including identification, authentication, and authorization information about each user, is stored as a user profile in a user profile store 390. Each user profile identifies the user to the system and defines their rights and accesses to system features. In addition, the user profile contains information about each user's processing preferences and interests (e.g. the interest profile). These preferences are additive to system object information (described above) and are used define to documents presented to the user, and each user's customized workflows (including a question profile comprising questions to be automatically asked as part of initial processing) and business objects information. The user's profile specifically identifies one or more user-specific "business objects" that may be additionally identified or used by extractors and classifiers operating within a user's context (more on user contexts later), and may provide information related to the processing instructions for, and the training of, the system's classifiers and extractors.

The system allows users to upload one or more documents, designate them as part of an interest profile (within their user profile), and make user contextual assessments of a corpus with respect to the profile. As an alternative to uploading documents to create a profile, users may create one or more interest profiles that are used to pre-select documents (from a document repository) that match those profiles in order to save the user the difficulty of sourcing new documents to review.

Users also may create a "question profile" which they can change at any time. This information is stored in the user profile as a set of questions that were selected by the user because the user is interested in the answers. For example, a user may always be interested in determining a point of contact for an opportunity described by an opportunity document, such as to determine if the user has submitted proposals or applications to a previous opportunity with the same point of contact. Additionally, the set of questions selected by users can be leveraged as part of a recommender system for suggesting additional questions that may be of interest. For example, in the same way online video streaming services suggest "Users that liked X, also liked Y", additional questions may be recommended to users. As a specific example, if many users that have asked "what is the deadline for submitting a response" have also asked "what is the point of contact," a user that asks a question related to due dates may be suggested questions related to the point of contact. If users have a question that is not present in the existing stores, they may be prompted to add a new question. Once this question is added, it is analyzed for the type of response required using a machine learning classifier designed to distinguish between types of questions. Example types of responses are date, time, person, place, thing, organization, cause, etc. The classifier is trained on an existing body of question types and distinguishes the answer accordingly. Similarly, the question is analyzed for its subject using part of speech tagging and linguistic analysis tools. These are stored, along with the original question, for use by the current user (and other users, if the question is shared).

For example, "Who is the point of contact?" would be converted into:

"response": "person",
"subject": "point of contact",
"text": "Who is the point of contact?"

or a comparable form. When the system later identifies an object within an opportunity document that answers a question in the question profile, the relevant information may be automatically provided to a user that is accessing the opportunity document through the system. Continuing the previous example, the user may be provided with the point of contact information for each opportunity document accessed by the user through the system. The desired answer may be identified by comparing, for example, the "subject" and "response" in the converted "point of contact" question to objects extracted from each opportunity document analyzed by the system.

One particular set of information stored in the user profile is each user's default contextual information, such as a default role. Contextual information permits the classifiers and extractors, as well as other system components such as the query manager 330 to perform their respective functions within the context of a particular user.

Both the system and user profile stores may be a persistent storage of the underlying computer system such as a local disk drive, may be network attached persistent storage such as network-attached-storage (NAS), a commercial database system such as those provided by the Oracle Corporation, or may be a custom storage system optimizes for the efficient storage of normalized textual objects, metadata, and extracted information.

Each "opportunity" may include information about one or more documents, one or more users and their contexts, historical information such as transaction and change logs, past queries, user notes/comments (including highlighted text identified by a user), populated business objects related to the opportunity, user-generated information about the opportunity (such as query/results, comments, notes, textual highlights) and status information related to the current status of the opportunity. The collection of materials representing an opportunity is called an opportunity corpus.

Information related to each opportunity (as well as any related materials) may be stored in one or more Opportunity Stores 323. Opportunity stores contain information about document(s) in each corpus in a structured format, as well as metadata about the documents and business objects information that has been extracted from these documents. References from each opportunity structure back to Document Store(s) and/or Text Object Store(s) are provided to permit the system to quickly access the source text in context. In general, the opportunity stores may be a persistent storage of the underlying computer system such as a local disk drive, may be network attached persistent storage such as network-attached storage (NAS), a commercial database system such as those provided by the Oracle Corporation, or may be a custom storage system optimizes for the efficient storage of normalized textual objects, metadata, and extracted information.

User-specific information about each opportunity, including opportunity specific contextual information for each user, previously used questions and answers, user notes, highlighted/marked text, intra-user discussion and information sharing details, and related information are stored in one or more user-opportunity stores 395. In general, the user opportunity stores may be a persistent storage of the underlying computer system such as a local disk drive, may be network attached persistent storage such as network-attached storage (NAS), a commercial database system such as those provided by the Oracle Corporation, or may be a custom storage system optimizes for the efficient storage of normalized textual objects, metadata, and extracted information.

A workflow manager 340 may implement the workflows of the system and manage the scheduled processes. Typically, the scheduled processes invoke one or more workflows as they are run. Example scheduled processes include scanning the document store 320 for new documents to process and evaluate for inclusion in a new opportunity corpus.

The workflow manager may receive defined document processing workflow specifications from the user and system profiles (as specified) and executes them. Each workflow specification may include definitions for one or more processing steps, such as executing extractors and/or classifiers, collecting metadata, evaluating questions against a document or corpus, adding a document to a corpus, etc.

In an embodiment, a query manager 330 provides the mechanism for identifying, preprocessing, executing, and post-processing automatic (system and user generated) and manually configured queries about an opportunity corpus.

The query manager provides a mechanism to automatically process questions, provide relevant text and information extraction, perform post-processing steps, and collect user feedback on the questions/answers. Unlike traditional search systems where the user inputs a question and a search engine searches for matching documents, the system provides contextual enhancement of questions in order to increase the relevance of the returned results. This contextual enhancement is performed by a contextual filter. A context filter identifies contextual information in the corpus and user profile information, uses this information to improve the question(s) by including contextual information or information implied by the identified contextual information, improving the precision of the answers provided to the user by filtering answers against the contextual and interest profile information (and discarding or deprioritizing results that do not pass the filtering evaluation). A contextual filter may be based upon one or more of time, role, user-behavior, user-collected data (notes, calendar, etc.) or other information that is used to improve the quality of the questions and answers presented for questions presented by a user. A contextual filter works for both pre-processing questions the user asks of the system and post-processing the answer based on contextual clues in the question answer workflow.

In general, the question/answer process against an opportunity corpus operates in the following manner:

Because different users have different needs regarding documents and not all of those can be anticipated, the system provides the ability for users to ask questions of the document. Typically, users may select a query from a set of pre-stored and pre-processed queries appropriate for their context. Alternatively or in addition, users may ask a question in natural language. This is then turned into a search query by removing stop words, and pronominal references, and lemmatizing or performing query expansion on any remaining nouns and verbs that are not named entities. These remaining "key terms" form an initial best-effort query that can be run on all of the sentences in the document in order to find a potential list of relevant passages. Optionally, the question can be enhanced as described below and the enhanced query is used in place of a simple key terms query.

Once these results are found, they are returned to the user. These matches can be rated as relevant or not-relevant by users, and those ratings are stored by the system and marked for later reference. Optionally, the system may make a post-processing pass over the results and eliminate or filter results that are not relevant in view of the user's context.

A plurality of queries may be performed against the corpus in this manner, and the results grouped in various ways. For example, all similar questions may be grouped so their answers are presented together. The results are then presented to the user for review and relevance marking, as described above.

Lastly, users may review the questions and supporting evidence (e.g. the answers) and input their own answer for a given question on this opportunity. This answer is stored in the system and can be shared with other users who are viewing the same questions, effectively crowdsourcing the next level of improvement on our question answering approach.

The system tunes itself in order to produce "better" classifications on an ongoing basis. Once a sufficient number of ratings are collected for a question, the system automatically uses the rating to train a classifier to identify more accurately relevant document fragments (e.g. sentences). Once the classifier achieves an acceptable aggregate performance, it may be automatically fielded as a new classifier 350 which is inserted into the workflows in place of a default text query. While this is a fully automated process, system administrators may be provided with the ability to override the search query terms or to replace the generated classifiers. In addition, because the system continually receives more labelled training data from the users and internal administrators, it can periodically retrain itself with the new training data and can re-field itself if its accuracy (measured, for example, by the F-score) has improved.

In an embodiment, questions may be pre-processed. Pre-processing questions improves the responses provided by the system because users often do not ask questions in adequate detail or use fully formed, grammatical correct sentences. For example, a user may wish to ask the question that looks for answers related to paperwork needed for regulatory accounting compliance for unallowable costs on a project. In order to get accurate answers, an ideal question might be "What are the deliverables related to cost counting compliance for unallowable costs related to FAR 31.201-6, that must be addressed prior to proposal submission?" However, most users will formulate the question as a short phrase with the words "deliverables for costs." Answers produced for questions related to "deliverables for costs" will vary highly, and typically will have relatively high recall and low precision. In order to increase precision of the results, the system may deduce the user role (as described below), along with any textual clues related to the question and the timeline related to the user in order to improve the question formulation, and then reformulate the question. Alternatively or in addition, more specific questions may be obtained from an existing collection of questions as disclosed herein, and used in place of a general or generic question posed by a user.

Similarly, post-processing enhancements may be based on, for example time, role, last actions, last questions, cluster of types of questions, user-notes and user-highlights from previous documents.

In an embodiment, the user's role may be determined in one of several ways. First, the role can be obtained by asking what their role is from a picklist or data entry. In addition, the user-role can be deduced by analyzing the questions, notes and highlights. For example, a finance manager will ask questions related to accounting such as cost accounting, cost reporting and cost compliance. These questions tend to be related to each other.

For example, the system may perform the following steps in collecting data on the user to help deduce their role:

First, group the related questions and identify their relatedness through similarity or its alignment with previously classified answers.

Second, the frequency of at which the questions are asked also may indicate their role in the project. The frequency of the types of questions asked thus also may be tracked in the system.

Third, electronic highlights that the user has made in the document may indicate the user's role. For example, an accountant may highlight sections of text in the document related to their particular interest, which may be different than the sections highlighted by a lawyer.

Fourth, any notes the user has added through a system-provided notes interface related to specific highlighted text in the document may indicate their role.

Fifth, any last actions recorded in the system that are not related to notes or document highlights are recorded. These last actions include calendar actions related to the project timeline, notes and content sent to teammates via sharing and linking and task type and priority.

Sixth, any role information that the user has specified for this opportunity corpus or in their user profile may be used as an indication of desired role. The roles used in other related corpora may also suggest a role for the user for the current corpus.

Although the example process for determining a user's role is described using various steps in a particular order, the steps may be performed in any order and may be performed partially or entirely in serial or in parallel. For example, in an embodiment, role information specified by a user for a particular opportunity or corpus may be used as a primary indicator of a user's role, with other indicators being used as supporting indicators or not at all. More generally, the indicators and steps to identify a user's role may be performed in any order or combination, or not at all, in various embodiments.

In addition to the determining the role of the user, the system also may determine a timeframe that the user is most likely interested in and refines the questions and answers in accordance with this determination. The process for determining timeframes is similar to the role determination processes described above. The system provides specialized classifiers that identify each element of the opportunity corpus as relating to some system-defined time slice (e.g. pre-bid, proposal-development, post-award). The system may then look at the user's behaviors to infer which time-slice is of most interest to them. Time-contextual clues are related to the phase of the project timeline, user urgency, last known actions related to calendar actions and notes shared and timestamp of each action.

At the highest level, users may define opportunity selection information comprising key decision points, interests, and keywords (that are stored as part of the user profile) for use when selecting opportunities. The decision points may include attributes selected from a list of known attributes for a document type, and required and/or optional values for these attributes. Alternatively or in addition, the user may provide text or documents that are processed to identify opportunity selection information. For example, the user may upload a capabilities statement, which is then processed by the system to extract interests, keywords, and related decision points. The user may also provide "similar interest" document that the system can process for opportunity selection information.

Alternatively, a user may upload one or more documents to a document store (or select from previously loaded documents already present in the document store) using a user interface (such as a web interface), a system monitored email address, a system monitored shared folder, etc.

Once uploaded into a document store, the user can manage their uploaded documents using typical select, create, read, update, and delete operations. The selected documents form the basis of one or more opportunity corpora.

Documents that are brought into the system are automatically pre-processed using the systems information extraction capabilities to determine basic metadata fields. This information is stored with the document in the document store, or is stored within the text object store (depending upon type of information extracted). Users of the system may manually correct the extracted document metadata fields in cases where the extracted metadata are incomplete or incorrect. Document sharing is also disabled for uploaded documents.

During these preprocessing steps, the text may be cleaned and additional document structure and opportunity metadata may be determined, converting the documents of the corpus from a display-oriented format (as in from a desktop publishing system) into one or more content streams that are stored in a text-object store as previously disclosed. Text cleaning may include steps such as removal of page footers and headers, reconstruction of hierarchical document structure, removal of publishing formatting, and the like. Documents are first converted from a metadata+documents format into an internal representation that consists of structured metadata, which may arrive as part of or simultaneously with the document, as well the text extracted from documents separated into segments at various boundaries (e.g. section, page, paragraph, sentence). This step may be beneficial because the file contents often are noisy and in heterogeneous formats, which may benefit from normalized and cleaned before being processed. The data in the documents are cut into consistent sentence or paragraph units, cleaned (e.g. excess white space removed, page formatting artifacts such as hyphens are removed), and the resulting content stream annotated. Each of these steps may be performed by one or more extractors or classifiers. The data products produced from this preprocessing step can be used for other analytic and recombination purposes such as aggregation, statistical analysis, predictions and historical trend analysis.

Page, paragraph, and sentence boundary detection may be performed under the control of a classifier that predicts likely segment breaks from the documents themselves using a set of features based on both the text content, but also meta fields such as text length, font size, and the length and font size of neighboring lines one line above and one line below the specified text.

The extracted text is also post-processed using typical natural language processing workflows and tasks such as entity extraction (entities, people, places, dates, etc.), part of speech tagging, and the like using extractors and classifiers under the control of a workflow operated by the workflow manager.

In some instances, an opportunity corpus is created and the documents and extracted text and information are automatically added to the newly created opportunity corpus. In other cases, the extracted text and information is stored for later use. All of the extracted information may be stored in one of the text object store, the opportunity store and/or the user-opportunity store as described above and is used to provide the basis and context to the opportunity management and information extraction components of the system.

Once the opportunity selection information is defined for the user and system, the system may use this information to select documents already stored in the system for further processing. More specifically, the system may automatically select documents as candidates to be added to one or more opportunity corpuses in several ways. In addition to standard user identified relatedness, document metadata and keyword matching, the system also may use other analysis techniques such as vector space modelling to select candidate documents for inclusion in an opportunity corpus. Based on the user interest profile, the system uses vector space models of candidate document contents to compute a similarity to the user's profile interests. This can be done, for example, by computing a vector representation of the words in the document, normalizing the vector representation, and computing the cosine of the angle between a document and an interest profile's content fragments as a measure of the similarity between the two.

Alternatively, the system may use recommender system techniques to identify candidate documents. In this approach, the system creates a matrix of users by documents (e.g. where, for example, the rows represent documents and the columns represent users). The value at each location is a score of the documented interest that each user has in that document. For example, a negative number could indicate a dislike, a positive number could indicate a like, and zero indicates no opinion documented. In this way, a user, A, can be matched to new documents when they have similar sets of ratings with another user, B, and when B has rated documents that A has not. In this case, the system can propagate the positive ratings that B has on documents where A's rating is 0 as predictive of A's interest in those documents.

Once the documents in the opportunity corpus are identified, another pass of information extraction and document classification may be performed using the user's contextual information, and the user may be presented with a formatted report including high level details extracted from the document. These details vary widely by the domain of the document and by the document selection and user contextual information stored in the user profile. Using RFPs as an example, users may be interested in: opportunity size (in dollars), customer, place of performance, set-aside requirements (e.g. minority owned businesses only), core requirements, evaluation criteria, etc. For IP licensing contracts, the relevant details might include costs, termination clauses, responsibilities of each party, etc.

The corpus materials then may pass through a natural language processing workflow that includes one or more extractors and classifiers as previously disclosed, which may extract relevant information about the opportunity corpus, identify business objects and opportunity metadata, calendar dates, and people mentioned in the corpus, and create additional annotations. Available document and opportunity metadata are normalized to provide key basic opportunity metadata. Examples of this opportunity metadata include: a unique ID, Title, Customer, Description, URL of source, RFP Due Date, RFP Posting Date, references to associated document files, opportunity sharing options. Having this normalized representation allows us to quickly move from these opportunities being separate types to being able to treat them in a uniform fashion. These are indexed in the stores with links to a detailed representation and source material that contains any additional information that doesn't map to the normalized representation.

If automated query processing is required or desired, it may be performed at this time, either as a separate step, or as part of a defined workflow.

The documents and metadata included in the opportunity corpus may be additionally processed using a corpus-specific workflow specified by either the system or user (from the respective profile), that is implemented, managed, and controlled by the workflow manager (as customized by information in the system and user profiles), and the results stored in the appropriate store.

In an embodiment, the opportunity may be scored for relevance using the interest information and filtering parameters provided in the user profile. For example, each interest that matches in an opportunity can increase the relevance ranking, so that opportunities that match multiple interests of a user are scored higher.

All extracted and derived information may be stored in one or more of the text object store, the opportunity store and/or the user-opportunity store described above. The information may be used to provide the basis and context to the information extraction components of the system.

In addition to using a relevance score to help identify documents and opportunities of interest, users may apply additional filtering by way of a pre-defined filter that will prevent certain opportunities from being displayed or notified to that user. This may include, for example, only seeing business opportunities from certain sources or whose work occurs in a certain geographical region, or it may put a limit on only seeing opportunities where they have more than 20 days to respond.

A pre-qualification report may be tailored to each user's profile, and may include a list of basic metadata (e.g. document title, document summary), the identified decision points from the user's profile, and a list of supporting evidence passages from each profile. Thus, a user may be able to more readily appreciate the scope and content of a document than would otherwise be possible using conventional document processing techniques.

The information that makes up the opportunity corpus may be used to generate a summary report containing the relevant details about the opportunity which is presented to the user. Typically, this presentation is provided through a web-based user interface, and/or may be delivered to them directly through some out-of-band communications channel such as email, a shared folder service like Dropbox, etc.

An opportunity summary report may be delivered to a user for a variety of reasons. For example, it may have been identified as a good match for the user, the user may have uploaded one or more of the documents in the corpus directly, or the like. Typically, the summary report is represented as a dashboard style view in the UI that includes key available metadata and answers to questions that are selected as part of the user's view profile. As previously stated, metadata, questions, and answer vary based on document type, and while our examples focus on business opportunity documents such as RFPs and grants, the overall system is equally useful for other types of documents.

Once users have reviewed the pre-qualification report, they may delve deeper into the document in question by proceeding to a detailed breakdown of material from the document. This view may also be filtered by additional profile information that specifies types of information the user would like to see in this second phase. Additionally in this second level view, users have the option of including a worksheet that they can fill out to help with their decision-making. Examples include a pros-vs-cons chart, a SWOT diagram, and other decision-making aids.

The user may then interact with the system to define additional questions for processing by the query manager, may mark specific returned passages for retention and/or relevance, and may elect to share one or more data items with other users.

In an embodiment, a system as disclosed herein may be pre-trained on labelled data to classify text segments as boilerplate content using, for example, standard bag of words representations for a segment or copies of well-known boilerplate such as FAR clauses. Copies of the well known text may be stored in the well known text store 322 as previously disclosed. Once RFPs are brought into the system and converted to context streams, the individual segments may be classified as boilerplate, for example, by marking the segments with an indicator such as "boilerplate=true" inside the segment's representation in the structured document. Thus, later phases of analysis can elect to avoid performing tasks on segments that are known or suspected to be boilerplate. For example, the user may ask to see the Opportunity with boilerplate removed or de-emphasized (such as by font color, etc.). Such a configuration may allow for more rapid and accurate understanding of the document by a user, whereas conventional document processing techniques would require the user to consider the boilerplate language.

Similarly, a specific boilerplate classifier may be used to identify contract clause inclusions, such as FAR clauses. These are standard legal clauses that are included either by full text or by reference in an RFP. Each such clause may extend the meaning of an RFP or similar document with known implications.

For example, a system as disclosed herein may use a machine learning classifier to recognize a segment as a FAR clause first. Next, the system uses regular expression matching to find FAR references and add them to a set of FAR references that is attached to the Opportunity corpus associated with this content stream. These references are used to connect to a separate database of implications and actions that are associated with a FAR clause reference. As a specific example, FAR 52.216-19 specifies that a contractor is not required to fulfill orders for less than $25.00. Upon identifying this clause, the system can be configured to provide an alert to the user noting that orders less than $25.00 need not be fulfilled under the FAR. Similar alerts, actions, warnings, etc. can be configured by the user through the system. Furthermore, the combined effects of multiple clauses may be automatically determined to identify effects that may not have been otherwise apparent to the user.

As another example, a classifier may identify an opportunity requirement, and may similarly present an indication of the requirement and/or a combined effect of the requirement with a boilerplate clause, another requirement, or any other information automatically extracted from an opportunity document as previously disclosed.

Because new questions may not be answerable automatically, they may be placed into a queue where human operators can further annotate those questions to include generalizations, paraphrasings, keywords or other inputs used for search algorithms over either the internal database representation of the opportunity based on the question asked or on the content stream of the opportunity corpus. Similarly, the system or human operator can select criteria for accepting/rejecting candidate answers. For example, a question that requires the date of a conference that occurs for proposers before submission can have a constraint added that it must be after the release date for the opportunity and before the response date.

At this point a default question answerer may be deployed configured with those information retrieval queries to surface relevant passages from the text. When those passages are returned, ranked by relevance, the system then uses a named entity recognition system to parse them to look for entities that match the desired response type. If one is found, it is evaluated against the specified criteria and if it passes, it is suggested as a possible answer. If multiple answers are found, they are surfaced in order, relying on the original search result ranking to rank the answers. Each answer has metadata that associates it to the original passage that contains it so that the user is shown context along with the result.

If no entities that match the response type are found, the relevant passages from the content may be surfaced to the user directly.

Figure 3:
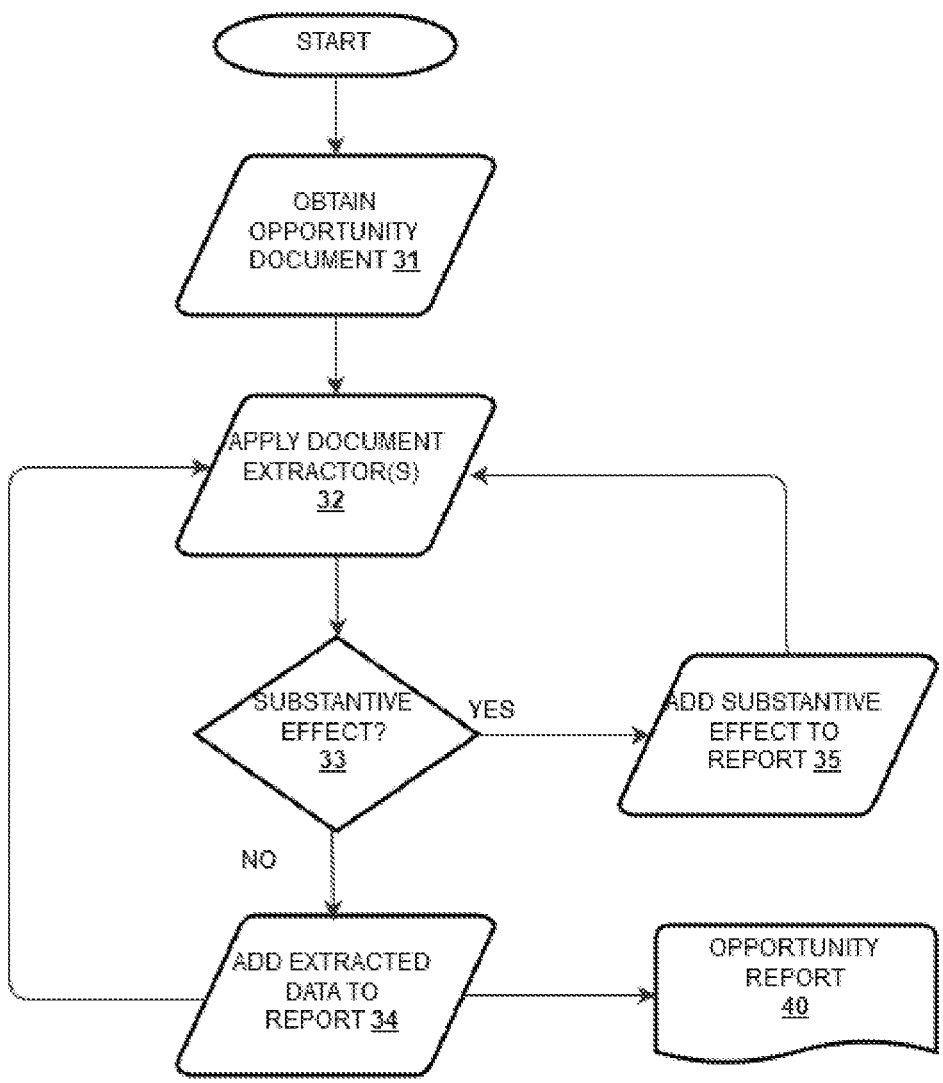
FIG. 3 shows an example method for obtaining and processing opportunity documents according to an embodiment of the disclosed subject matter.

FIG. 3 shows an example process for extracting information from a document, such as an opportunity document, according to an embodiment of the disclosed subject matter. At 31, an opportunity document may be obtained via any of the techniques and channels disclosed herein. At 32, one or more document extractors may be applied, for example, as disclosed with respect to FIG. 2. If the extractor obtains information that has a substantive effect at 33, the substantive effect may be identified. For example, as previously disclosed, effects of standard boilerplate terms may be determined or other substantive effects may be identified. Any such identified substantive effect may be stored in the system at 35, and/or it may be provided in a report to a user as previously disclosed. If the extracted information is informative without a substantive effect, such as contact information for a point of contact, document formats for submission, or the like, it may be stored and/or provided in a report to a user at 34. As previously disclosed, an opportunity report may be generated and provided at 40.

Thus, using the techniques and systems disclosed herein, opportunity documents may be more efficiently obtained, processed, and/or rendered suitable for use by one or more end users, while avoiding the inefficiencies and inaccuracies that conventional opportunity document processing techniques typically incur.

Figure 4:
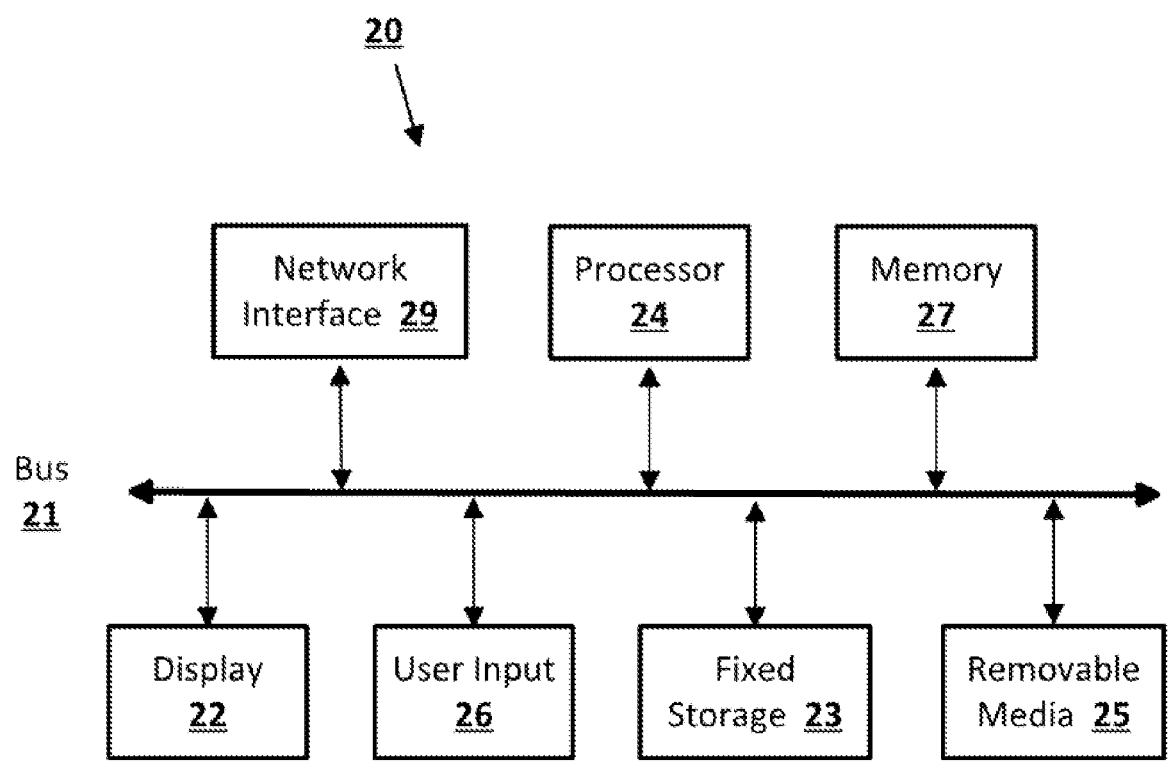
FIG. 4 shows a computing device suitable for use with embodiments of the disclosed subject matter.

Embodiments of the presently disclosed subject matter may be implemented in and used with a variety of component and network architectures. FIG. 4 is an example computing device 20 suitable for implementing embodiments of the presently disclosed subject matter. The device 20 may be, for example, a desktop or laptop computer, a server or server system, a mobile computing device such as a smart phone or tablet, or the like. The device 20 may include a bus 21 which interconnects major components of the computer 20, such as a central processor 24, a memory 27, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner and, conversely, all of the components shown in FIG. 4 need not be present. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include and/or may be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising, by a first computer system:
   obtaining a first document, the first document comprising a combination of prose, semi-structured text, and standard clauses used in a plurality of similar other documents and defining at least one task to be performed by a user;
   applying a plurality of extractors to extract document data having a plurality of data types from the first document, wherein each extractor of the plurality of extractors is configured to extract a corresponding type of the plurality of data types, and wherein each data type is associated with the corresponding extractor of the plurality of extractors and selected from a group consisting of: document structure information, a well known object comprising information previously extracted from one or more of the similar other documents, information about a person, a business object, a time period, an opportunity requirement defined in the first document, and a change to an opportunity document corpus; and automatically presenting the document data to a user, the document data comprising: an indication of a structure of the document, a substantive effect of at least one well known object in the document, a substantive effect of a clause in the document, the contents of the document, or a combination thereof.

2. The computer-implemented method of claim 1, wherein the step of applying the plurality of extractors comprises:

applying a first extractor to extract document structure information;

wherein the document data comprises the document structure information.

3. The computer-implemented method of claim 2, wherein the step of applying the plurality of extractors comprises:

applying a second extractor to identify a well known document object in the first document;

wherein the document data comprises an indication of a substantive effect of the well known document object on the task.

4. The computer-implemented method of claim 3, wherein the step of applying the plurality of extractors comprises:

applying a third extractor to identify a time period associated with the task;

wherein the document data comprises an indication of the time period.

5. The computer-implemented method of claim 4, wherein at least two of the plurality of extractors are executed in parallel.

6. The computer-implemented method of claim 1, wherein the plurality of extractors are executed in parallel.

7. The computer-implemented method of claim 1, wherein the plurality of extractors are executed serially.

8. The computer-implemented method of claim 1, further comprising:

receiving a query from a first user for information about the task;

automatically providing a response to the query, the response comprising information automatically extracted from the first document.

9. The computer-implemented method of claim 8, wherein the response comprises the document data.

10. The system of claim 1, wherein the processor is further configured to:

receive a query from a first user for information about the task;

automatically provide a response to the query, the response comprising information automatically extracted from the first document.

11. The system of claim 10, wherein the response comprises the document data.

12. A system comprising:

a computer-readable medium storing a first plurality of documents and data extracted from a second plurality of documents, the second plurality including at least one document not included in the first plurality; and a processor configured to:

obtain a first document of the plurality of documents, the first document comprising a combination of prose, semi-structured text, and standard clauses used in a plurality of similar other documents and defining at least one task to be performed by a user;

apply a plurality of extractors to extract document data having a plurality of data types from the first document, wherein each extractor of the plurality of extractors is configured to extract a corresponding type of the plurality of data types, and wherein each data type is associated with the corresponding extractor of the plurality of extractors and selected from a group consisting of: document structure information, a well known object comprising information previously extracted from one or more of the similar other documents, information about a person, a business object, a time period, an opportunity requirement defined in the first document, and a change to an opportunity document corpus; and automatically present the document data to a user, the document data comprising:

an indication of a structure of the document, a substantive effect of at least one well known object in the document, a substantive effect of a clause in the document, the contents of the document, or a combination thereof.

13. The system of claim 12, wherein the step of applying the plurality of extractors comprises:

applying a first extractor to extract document structure information;

wherein the document data comprises the document structure information.

14. The system of claim 13, wherein the step of applying the plurality of extractors comprises:

applying a second extractor to identify a well known document object in the first document;

wherein the document data comprises an indication of a substantive effect of the well known document object on the task.

15. The system of claim 14, wherein the step of applying the plurality of extractors comprises:

applying a third extractor to identify a time period associated with the task;

wherein the document data comprises an indication of the time period.

16. The system of claim 15, wherein at least two of the plurality of extractors are executed in parallel.

17. The system of claim 12, wherein the plurality of extractors are executed in parallel.

18. The system of claim 12, wherein the plurality of extractors are executed serially.

* * * * *